3,195,775
BRIDGE BREAKER FOR HOPPER VALVE
James O. Thomas and Floyd T. Read, Birmingham, Ala., assignors to Read Steel Products, Inc., a corporation of Alabama
Filed Aug. 1, 1963, Ser. No. 299,242
4 Claims. (Cl. 222—52)

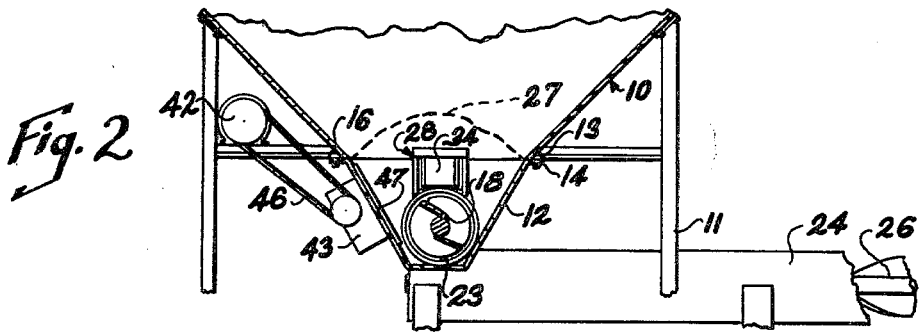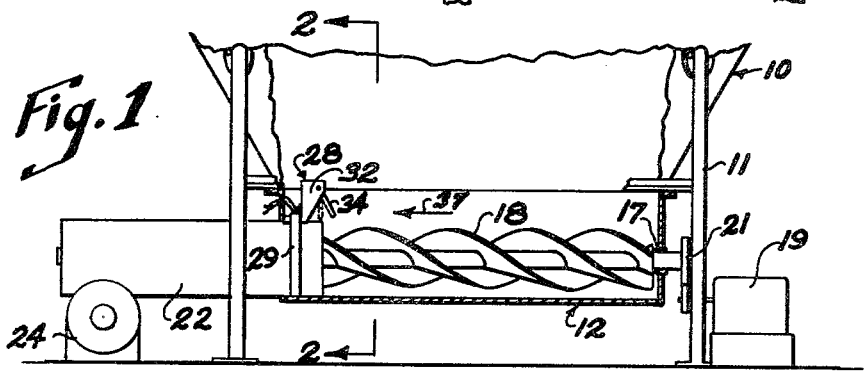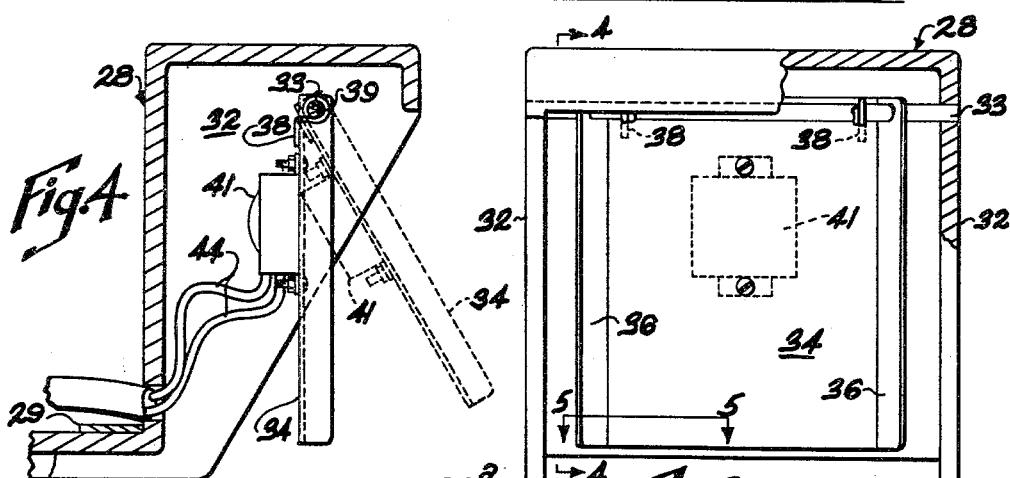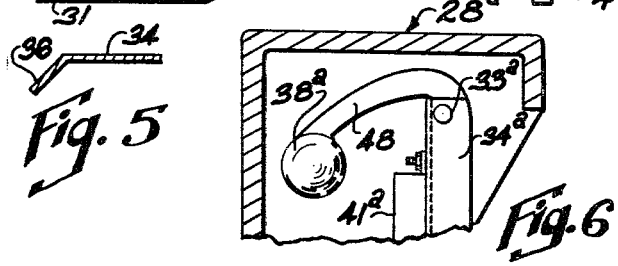

This invention relates to a bridge breaker for a hopper valve and more particularly to apparatus which shall break a bridge immediately upon formation thereof adjacent the discharge passageway for the hopper valve, thereby assuring smooth, continuous operation of the apparatus at all times.

An object of our invention is to provide a bridge breaker of the character designated which shall be positioned at the critical point where flow always ceases as a result of bridging.

Another object of our invention is to provide a bridge breaker which detects the absence of materials adjacent the discharge passageway immediately and then actuates a vibratory unit which in turn breaks the bridge to thereby assure continuous flow of materials without continuous operation of the vibratory unit.

Another object of our invention is to provide a bridge breaker of the character designated which shall be particularly adapted for conveying granular materials, such as animal feeds which contain sticky substances, such as molasses or the like.

A further object of our invention is to provide a bridge breaker for a hopper valve which is completely automatic in operation and requires a minimum of maintenance for trouble-free operation at all times.

A still further object of our invention is to provide a bridge breaker for a hopper valve which shall be simple of construction, economical of manufacture, and one which may be employed in conventional feed tanks or bins.

Heretofore in the art to which our invention relates, various means have been devised for breaking bridges formed in granular materials, such as animal feeds and the like. For example, vibrators, shakers and the like have been installed on feed bins and operated manually at the time bridging is detected or are left running continuously. Where manually operated vibrators are employed, there is a severe time-loss due to the fact that there is a substantial distance between the point of bridging to the point of discharge from the apparatus. Accordingly, the worker must wait until materials cease to flow from the apparatus before the bridge is detected. The vibrators are then set in motion to break the bridge whereupon feed of materials is resumed. No feed will then be discharged from the apparatus until the feed has had time to move from the discharge passageway in the hopper valve to the point of discharge from the apparatus. With conventional apparatus, a substantial amount of material is required to fill the discharge conduits and the like located between the discharge passageway of the hopper valve and the point of discharge from the apparatus.

There are many disadvantages in allowing the vibrating unit to run continuously. Not only does such an operation require more power and the operation is noisy, but continuous operation of the vibrating unit causes the material to pack within the hopper valve whereby it will not feed.

To overcome the above and other difficulties, we mount a bridge detector adjacent and at an elevation above the discharge passageway in the hopper valve whereby bridging is detected immediately upon formation thereof. The bridge detecting means is operatively connected to a vibrator unit whereby vibration is imparted to the apparatus for a period of time to break the bridge. The vibrating unit is then deenergized automatically as feed is resumed, thereby eliminating the necessity of providing manual means for operating the vibrating units and eliminating the necessity of operating the vibrator unit continuously.

Apparatus embodying features of our invention is illustrated in the accompanying drawing, forming a part of this application, in which:

FIG. 1 is a side elevational view, partly broken away and in section, showing our improved apparatus associated with a feed bin;

FIG. 2 is a sectional view taken generally along the line 2—2 of FIG. 1;

FIG. 3 is an enlarged front elevational view showing the actuating mechanism removed from the hopper valve;

FIG. 4 is a sectional view taken generally along the line 4—4 of FIG. 3;

FIG. 5 is a fragmental view taken generally along the line 5—5 of FIG. 3; and,

FIG. 6 is a fragmental, sectional view showing a modified form of our invention.

Referring now to the drawing for a better understanding of our invention, we show a feed bin 10 which is supported by a suitable frame 11, as shown in FIGS. 1 and 2. The lower end of the feed bin 10 communicates with a hopper valve 12 which extends longitudinally of the feed bin, as shown. The hopper valve is secured to the main body portion of the feed bin 10 by providing outturned flanges 13 at the lower end of the feed bin and outturned flanges 14 at the upper end of the hopper valve 12. The flanges 13 and 14 are then secured to each other by bolts 16.

Extending longitudinally of the hopper valve 12 and mounted for rotation in suitable bearings 17 is an auger or screw-type conveyor 18. The auger 18 is operatively connected to a suitable source of power, such as a motor 19 by a belt and pulley arrangement indicated generally at 21.

Communicating with the hopper valve 12 is a discharge conduit 22 having a discharge passageway 23 therein, as shown in FIG. 2. The materials conveyed through the discharge conduit 22 are discharged into a delivery conduit 24 which may be of any suitable length to convey the material to a desired point of discharge. As shown in FIG. 2, the conduit 24 may have a screw conveyor 26 therein for conveying the material to the point of discharge.

As the materials are conveyed toward the discharge passageway 23 by the screw conveyor 18, the materials often form a bridge, indicated by the dotted line 27 in FIG. 2. While the bridging is erratic and may occur anywhere in the storage bin 10, we have found that the location where the flow of materials stops is always the same. That is, adjacent and at an elevation above the discharge passageway 23. It is at this critical location that we mount our means for detecting the interruption of the flow of materials and our means for actuating the vibratory unit.

The detecting and actuating means comprises a support bracket 28 which is mounted on the discharge conduit 22 directly above the discharge passageway 23, as shown in FIGS. 1 and 2. The support bracket 28 is secured in place by suitable means, such as a strap 29 which is adapted to surround a horizontally extending portion 31 of the support bracket 28 and the discharge conduit 22.

The support bracekt 28 is provided with side walls 32 which are inclined toward the discharge end of the hopper valve 12, as shown in FIGS. 1 and 4. Extending transversely between the side walls 32 of the support bracket 28 and connected non-rotatably thereto is a transverse shaft 33. Mounted for rotation on the transverse shaft 33 and depending therefrom is a plate-like member 34 having vertical edges 36 which flare outwardly opposite the direction of flow of materials in the hopper valve 12, the direction of flow being indicated by the arrow 37. Accordingly, the plate-like member 34 is in position to be engaged by the material as it flows downwardly and inwardly through the discharge passageway 23.

Torsion springs 38 are interposed between the shaft 33 and the plate-like member 34 whereby the plate-like member 34 is urged toward the dotted line position shown in FIG. 4. One end of each torsion spring may be anchored to the shaft 33 as at 39, by suitable means, while the other end of the torsion spring engages the plate-like member to urge the same toward the dotted line position.

Mounted on the plate-like member 34 is a switch element 41 which is adapted to be open while the plate-like member is in the vertical solid line position shown in FIG. 4. On the other hand, the switch element 41 is adapted to be closed when the plate-like member 34 moves to the dotted line position shown in FIG. 4. Preferably, the switch element 41 is a conventional mercury switch which automatically closes upon movement of the plate-like member 34 to the tilted or dotted line position. The switch element 41 is operatively connected to a motor 42 for a vibrating unit 43 by suitable electrical conduits 44 whereby the motor is energized each time the plate-like member 34 moves to the dotted line position shown in FIG. 4. The motor 42 is connected to the vibrating unit 43 by a suitable drive belt 46. Preferably, the vibrating unit 43 is mounted on a reinforcing plate 47 which is secured to a side wall of the hopper valve 12, as shown in FIG. 2.

From the foregoing description, the operation of our improved apparatus shown in FIGS. 1–5 will be readily understood. As the materials are forced through the discharge passageway 23 by the screw conveyor 18, the materials engage the depending plate-like member 34 whereupon it is moved to the solid line position shown in FIG. 4. In this position, the mercury switch element 41 is open whereby the motor 42 for the vibrator unit is deenergized. On the other hand, in the absence of materials flowing into the discharge passageway 23, the depending plate-like member 34 is free to be urged by the springs 38 to the dotted line position shown in FIG. 4. In the dotted line position, the mercury switch 41 is closed whereupon the motor 42 for the vibrator unit 43 is energized. The vibrator unit continues to run until the bridge is broken. Immediately upon breaking the bridge, the material again engages the plate-like member 34 whereupon it is moved to the solid line position shown in FIG. 4 to thereby open the mercury switch 41 and in turn deenergize the motor 42 for the vibrator unit. It will thus be seen that the vibrator unit is energized immediately upon the formation of a bridge which interrupts flow of materials through the discharge passageway 23. The vibrator unit then runs only for a sufficient time to break the bridge whereupon it is deenergized.

Referring now to FIG. 6 of the drawing, we show a further modified form of our invention in which a plate-like member 34$^a$ is mounted for pivotal movement relative to a transverse shaft 33$^a$. The plate-like member 34$^a$ carries a switch element 41$^a$. The shaft 33$^a$ is mounted within a support bracket 28a similar to the support bracket 28. Also, the plate-like member 34$^a$ and the switch element 41$^a$ are adapted for pivotal movement about the shaft 33$^a$ as described hereinabove relative to FIGS. 1–5 whereby the plate-like member 34$^a$ is urged toward a position to close the switch element 41$^a$ upon the formation of a bridge which interrupts flow of materials through the discharge passageway. Instead of employing torsion springs to urge the plate-like member 34$^a$ toward a position to close the switch element 41$^a$, we show in FIG. 6 a counterweight 38$^a$ which is connected to the plate-like member 34$^a$ by an arm 48. Accordingly, the plate-like member 34$^a$ remains in the position shown in FIG. 6 as long as materials are forced thereagainst as they are fed through the discharge passageway 23. On the other hand, upon the formation of a bridge and the interruption of the flow of the materials, there would be an absence of materials against the plate-like member 34$^a$ whereupon the counterweight 38$^a$ would move the same toward a tilted position to thereby close the switch element 41$^a$ and in turn energize the motor 42 for the vibrating unit 43 as described hereinabove.

From the foregoing, it will be seen that we have devised an improved bridge breaker for a hopper valve. By providing means for breaking a bridge immediately upon formation thereof, there is no interruption of the passage of materials through the feeding apparatus. Also, by energizing the vibratory unit only during the interruption of feed, we eliminate the added cost of operating a vibratory unit continuously and at the same time eliminate the packing of materials within the hopper valve, thereby assuring trouble-free operation of the feed mechanism at all times. Furthermore, by locating the movable actuating member 34$^a$ adjacent and at an elevation above the discharge passageway 23, we not only assure smooth and continuous operation of the apparatus at all times, but eliminate the necessity of providing manual means for controlling the vibratory unit.

While we have shown our invention in two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. A bridge breaker for a generally horizontally extending trough-like hopper member mounted subjacent a supply bin in position to receive granular materials from said bin and having a discharge passageway adjacent one end thereof with means to convey granular materials longitudinally of said trough-like hopper member to said discharge passageway, (a) a movable plate-like actuating member mounted for pivotal movement within the confines of said trough-like hopper member adjacent and at an elevation above said discharge passageway in position to move to one location in response to the presence of said materials adjacent and at an elevation above said discharge passageway, (b) means urging said plate-like actuating member to another location while there is a bridge of said materials adjacent and at an elevation above the discharge passageway, (c) a vibrator unit mounted in position to impart vibration to the hopper member upon being energized, and (d) means operatively connecting said plate-like actuating member to said vibrator unit to energize said vibrator unit while said actuating member is in said another location and to deenergize said vibrator unit while said actuating member is in said one location.

2. A bridge breaker as defined in claim 1 in which the means urging said plate-like member toward said another location comprises a spring member.

3. A bridge breaker as defined in claim 1 in which the means urging said plate-like member toward said another location comprises a counterweight carried by said plate-like member.

4. A bridge breaker as defined in claim 1 in which the means operatively connecting the actuating member to the vibrator unit comprises a switch element carried by said actuating member and disposed to remain open while said actuating member is in said one direction and disposed to close upon movement of said actuating member to said another location.

References Cited by the Examiner
UNITED STATES PATENTS

| | | | |
|---|---|---|---|
| 1,460,573 | 7/23 | Church et al. | 222—202 X |
| 2,276,383 | 3/42 | Francis | 222—55 |
| 2,648,461 | 8/53 | Stephenson | 222—413 X |
| 2,759,614 | 8/56 | Stock | 222—55 X |
| 2,803,380 | 8/57 | Witte | 222—202 X |

EVERETT W. KIRBY, *Primary Examiner.*

HADD S. LANE, LOUIS J. DEMBO, *Examiners.*